(12) United States Patent
Dam et al.

(10) Patent No.: US 6,631,639 B1
(45) Date of Patent: Oct. 14, 2003

(54) SYSTEM AND METHOD OF NON-INVASIVE DISCREET, CONTINUOUS AND MULTI-POINT LEVEL LIQUID SENSING USING FLEXURAL WAVES

(75) Inventors: Naim Dam, Muttontown, NY (US); Howard Paul Austerlitz, Stonybrook, NY (US)

(73) Assignee: Cosense, INC, Hauppauge, NY (US)

( * ) Notice: Subject to any disclaimer, the term of this patent is extended or adjusted under 35 U.S.C. 154(b) by 0 days.

(21) Appl. No.: 10/231,595

(22) Filed: Aug. 30, 2002

Related U.S. Application Data

(60) Provisional application No. 60/317,916, filed on Sep. 7, 2001.

(51) Int. Cl.⁷ ............................................. G01F 23/28
(52) U.S. Cl. .................................... 73/290 V; 340/621
(58) Field of Search ........................ 73/290 V; 340/64

(56) References Cited

U.S. PATENT DOCUMENTS

| | | | | |
|---|---|---|---|---|
| 2,668,365 A | * | 2/1954 | Hogin ........................... | 34/576 |
| 2,990,543 A | * | 6/1961 | Rod ............................. | 340/621 |
| 3,079,596 A | * | 2/1963 | Atkinson ...................... | 340/621 |
| 4,213,337 A | | 7/1980 | Langdon ...................... | 73/290 V |
| 4,248,087 A | | 2/1981 | Dennis et al. ................ | 73/290 V |
| 4,461,178 A | | 7/1984 | Chummel ..................... | 73/599 |
| 4,474,061 A | * | 10/1984 | Parker .......................... | 73/149 |
| 5,015,995 A | | 5/1991 | Holroyd ...................... | 340/621 |
| 5,456,114 A | | 10/1995 | Liu et al. ..................... | 73/597 |
| 5,616,856 A | * | 4/1997 | Castel ......................... | 73/61.45 |
| 5,793,705 A | * | 8/1998 | Gazis et al. .................. | 367/98 |
| 6,192,751 B1 | | 2/2001 | Stein et al. .................. | 73/290 V |

* cited by examiner

Primary Examiner—Helen Kwok
Assistant Examiner—Katina Wilson
(74) Attorney, Agent, or Firm—Gordon D. Coplein

(57) ABSTRACT

A non-invasive system and method for measuring liquid level in a vessel utilizes a pair of ultrasonic transducers mounted spaced apart externally on the vessel wall. One of the transducers excites a single pulse of sonic energy that produces a flexural, or elastic, wave in the wall and the second transducer receives the flexural wave to produce an electrical signal waveform corresponding to the travel time of the flexural wave between the two transducers. The electrical waveform signals produced at different times are compared to determine if a phase delay exists between two waveform signals, which indicates that there has been a change in the liquid level condition in the vessel interior space between the two transducers. Measuring the phase delay, or time delay, between the flexural wave components produced at two different times is used to indicate presence or absence of the liquid at a point on the vessel and/or the height of the liquid in the space.

20 Claims, 4 Drawing Sheets

SYSTEM AND METHOD OF NON-INVASIVE DISCREET, CONTINUOUS AND MULTI-POINT LEVEL LIQUID SENSING USING FLEXURAL WAVES

PROVISIONAL APPLICATION

This patent application claims the priority of U.S. Provisional Application Ser. No. 60/317,916, filed Sep. 7, 2001.

FIELD OF THE INVENTION

The present invention is in the field of ultrasonic liquid level sensors mounted on the outside of a tank or vessel to measure liquid level at single or multi-point levels or on a continuous basis by the use of sensing flexural waves in the vessel wall.

BACKGROUND OF THE INVENTION

Measurement of liquid levels in a tank or other vessel by use of an ultrasonic transducer is a well known art. Many instruments of this type have the transducer in contact with the liquid in the vessel interior to sense the level. Another type of ultrasonic liquid level detection instrumentation mounts the transducer on the outside of the vessel wall and transmits the ultrasonic energy to or through the vessel wall.

For example, U.S. Pat. No. 5,663,505, which is assigned to the assignee of the subject application, mounts the transducer on the outside of the vessel wall. Ultrasonic energy is transmitted through the wall and is reflected back through the wall to the transducer. This arrangement operates effectively so long as the ultrasonic energy transmitted through the wall is reflected back from the other side of the inner wall. Due to the nature of the different liquid's density and vessel wall thicknesses the ultrasonic energy can be attenuated by an amount such that there may be no alarm or a false alarm produced.

U.S. Pat. No. 5,456,114 discloses a system which uses a transmitting mechanical transducer and a receiving mechanical transducer mounted on the outside of a tank/vessel wall to measure liquid level by sensing an elastic wave produced un the vessel wall. Here, the transmitting transducer produces energy to propagate a relative high frequency (12.5 khz) elastic wave through the wall of the vessel. The speed of propagation of the elastic wave through the wall of the tank is effected by whether there is a liquid present against the inner wall of the tank along the propagation path. The change in time of propagation is measured by a zero crossing technique to determine presence or absence of a liquid in contact with the inner wall of the vessel.

This technique has limitations as follows:

(a) any build up of any kind, solid or semi solid, on the vessel inner wall along the propagation path of the elastic wave, will change the propagation time, resulting in false alarm such that the system becomes unreliable.

(b) this liquid level sensing technique requires initial measurement of vessel wall thickness and material since this has a direct effect on the propagation time of the elastic wave. This requires extra effort before installing the system.

(c) the system requires initial calibration as the transmission of the elastic wave at 12.5 kHz provides a very small change in travel time of the elastic wave, e.g., less than 10–15 microseconds. Also, the spacing between the transmitting transducer and receiving transducer is very critical. For example, in a vessel having a steel wall ¼" thick, the propagation of the elastic wave is approximately 30 microseconds/inch. A change in spacing of the transducers of ¼" produces a delay of 7–8 microseconds which is greater than the threshold set by (10 microseconds). Thus, the system of this patent can produce false alarms.

The system disclosed in U.S. Pat. No. 6,192,751 is intended to overcome the problem of solid/semi solid build up on the inner wall of the tank/vessel that is present in the foregoing U.S. Pat. No. 5,456,114. U.S. Pat. No. 6,192,751 discloses a non-invasive level system using a low frequency elastic wave in the vessel wall at a frequency of 750 Hz. This system uses a mechanical shaker, disclosed as Ling model no: 207, as a transmitter transducer and an accelerometer, model AMP01, as a receiver to measure the change in time of propagation of the elastic wave. Instead of using a zero cross detecting system, as used in U.S. Pat. No. 5,456,114, a cross-correlation detecting system is used. In operation, the system initially takes a base line initial reading of the known liquid level and stores this in a cross-correlator. The time of the propagation of an elastic wave along the propagation path is determined as a function of both the degree of the time shift between the signals and amount of sample by sample amplitude difference between signals. The limitation of this system is that every tank or vessel requires initial conditions and data comparison requirements for each application. This becomes impractical to implement, for example, in commercial uses such as for vessels of large liquid volume, sometimes a million or more gallons in a storage tank, which cannot be easily emptied or filled. Also, the mechanical shaker requires heavy duty electrical power to drive the mechanical transmitting transducer. This gives rise to installation problems since the storage tank can contain gasoline, diesel fuel or various hazardous chemicals. In such cases drilling and welding of the tank is not allowed.

The system of each of U.S. Pat. Nos. 5,456,114 and 6,192,751 uses a tone burst of 10 or more cycles of a high power driving signal to drive the transmitting transducer and also use the lowest order asymmetric flexural wave. This can reduce the accuracy of the measurement.

SUMMARY OF THE INVENTION

To overcome the above mentioned problems, the present invention provides a non-invasive level measuring system utilizing a pair of ultrasonic transducers mounted spaced apart externally on the vessel wall. One of the transducers, the transmitter, excites a single pulse of sonic (electro-mechanical) energy, which can be of relatively low amplitude. The second transducer is located at a fixed distance from the first and acts as a receiving transducer. The single pulse that is transmitted by the transmitting transducer in the vessel wall generates a flexural, or elastic, wave in the wall.

The system and method utilizes a component of the received flexural wave to detect presence or absence of liquid inside of the vessel in the space between the two transducers. This is accomplished using a technique that measures the change in phase velocity of the elastic wave as it travel through the vessel wall. That is, for any given vessel a component of the flexural wave produced by the pulse travels in its wall at a different velocity depending upon whether there is liquid in the vessel in the space between the two transducers. Measuring the difference, or phase delay, between the phase velocity of the flexural wave components when there is no liquid in the interior vessel space between the two transducers and when there is liquid present produces an indication of whether or not there is liquid in the space. Also, it has been determined that a substantially linear relation exists for the amount of the phase delay between the received components as to the height of the liquid level in this space. Therefore, the system can produce a continuous level determination of the liquid in the space or indicate that the liquid has reached one or more predetermined points.

DETAILED DESCRIPTION OF THE INVENTION

Figure 1:
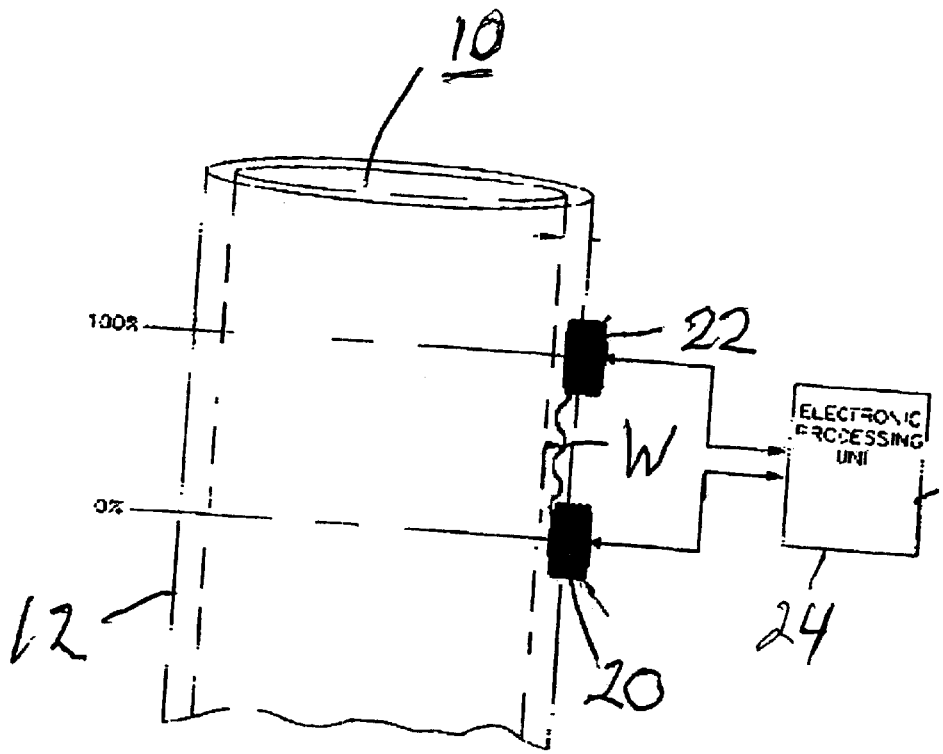
FIG. 1 is a schematic diagram of a typical system configuration.

FIG. 1 illustrates the general application of the mounting and placement of the transducers in the system of the invention. There is a tank 10, hereafter referred to as a vessel since the invention is applicable to different shapes of containers. The vessel 10 can be of any height or diameter and the wall 12 can be of any material including metals such as steel or stainless steel, plastic, glass, wood, etc. The vessel wall 12 can be of any thickness, depending upon the application for which the vessel is being used. Also, the top of the vessel can be open or closed, or part closed. The interior of the vessel can be pressurize if the vessel is closed.

A pair of ultrasonic transducers 20 and 22 are mounted on the exterior of the vessel wall. The transducers can be of any conventional type and any suitable conventional transducer for ultrasonic energy can be used. A typical transmitting transducer 20 uses a PZT crystal that is excited with a pulse of voltage supplied from a processing module 24, to be described, to produce electro-mechanical energy that is transmitted to the vessel wall and generates a flexural, or elastic, wave W in the wall. The receiving transducer 22 is of similar construction and converts the received flexural wave component into an electrical signal that is supplied to the module 24 for further processing. While the transmitting transducer 20 is illustratively shown as being the lower of the two transducers, the reverse arrangement can be use and transmitting transducer 20 be the top one.

The transducers 20 and 22 typically are mounted to the vessel wall by a strap, by a bracket, by an adhesive such as an epoxy, or any other suitable arrangement so that the front face of the transducer is in intimate contact with the vessel wall 12. Usually, a coupling compound such as petroleum jelly is used between the transducer front face and the wall. The transducers are spaced vertically apart by a span range distance d, set upon installation. The transducers 20, 22 are preferably placed vertically in-line with each other.

Transmitter transducer 20 receives a single pulse of voltage of a suitable duration from module 24 and converts it to a pulse of electro-mechanical energy that is applied to the vessel wall. The single pulses repeat and are sequentially produced and spaced in time. Each electro-mechanical energy pulse generates a flexural wave in the wall that is received by the receiving transducer 22. The single pulses spaced apart create a time window to allow for processing of the received signal by module 24.

The following is theory presented as an aid in understanding the operation of the invention. The equation of motion for flexural (bending) waves in a beam is:

$$\frac{d^2 y}{dt^2} + C_L^2 K^2 \frac{d y^4}{d x^4} = 0 \tag{Eq. 1}$$

where;

$C_L = \sqrt{E/\rho}$ and is the speed of a quasi-longitudinal wave,

E is Young's modulus, and $\rho$ is the mass density.

This equation of motion is a fourth-order differential equation such that the solutions are not of the form $y(x,t) = f(x-ct) + g(x+ct)$.

In addition, the flexural wave speed is:

$$V_F = \sqrt{fheight \omega K C_L} = \sqrt{2 \Pi F C_L \cdot K} \tag{Eq. 2}$$

where;

$C_L$ = longitudinal wave speed,

F = frequency, and

K = constant that is a function of wall thickness.

By Eq. 2 it is shown that the wave speed is proportional to the square root of frequency. Thus, higher frequency flexural waves will travel in the wall faster than lower frequency flexural waves.

In accordance with the invention this principle is utilized by applying a pulse of energy to a transmitting transducer mounted on the wall of a vessel and the pulse produces flexural waves in the wall. In theory, a pulse of energy has an infinite number of frequency components so that the flexural wave that travels in the wall also has an infinite number of frequency components and they travel at different speeds in the wall. Higher frequency waves travel faster and arrive first at the wall mounted receiving transducer while lower frequency waves travel slower and arrive later.

The above Eq. 2 applies for the vessel wall when there is no liquid present in the vessel in the area of the wall where the waves are traveling. As the liquid appears on the inner side of the vessel wall the speed of the wave changes and $$V_{FLiq} = \frac{A}{V_F(1 + B^{1/2}(1-B)^{1/2})} \tag{Eq. 3}$$

where;

$V_{FLiq}$ = flexural wave speed in presence of liquid on inner wall of vessel,

A = complex mass density ratio, and

B = ratio of longitudinal frequency to dilatational frequency in wall.

Equations (2) and (3) show that there is a time phase or time difference between the propagation velocity, and waveforms representative thereof, caused by the application of the energy pulse to the vessel wall by transducer 20 when te vessel is dry and when there is liquid present. The system of the invention measures this difference and uses it for determination of a liquid absence/presence condition in the span range space.

Figure 2:
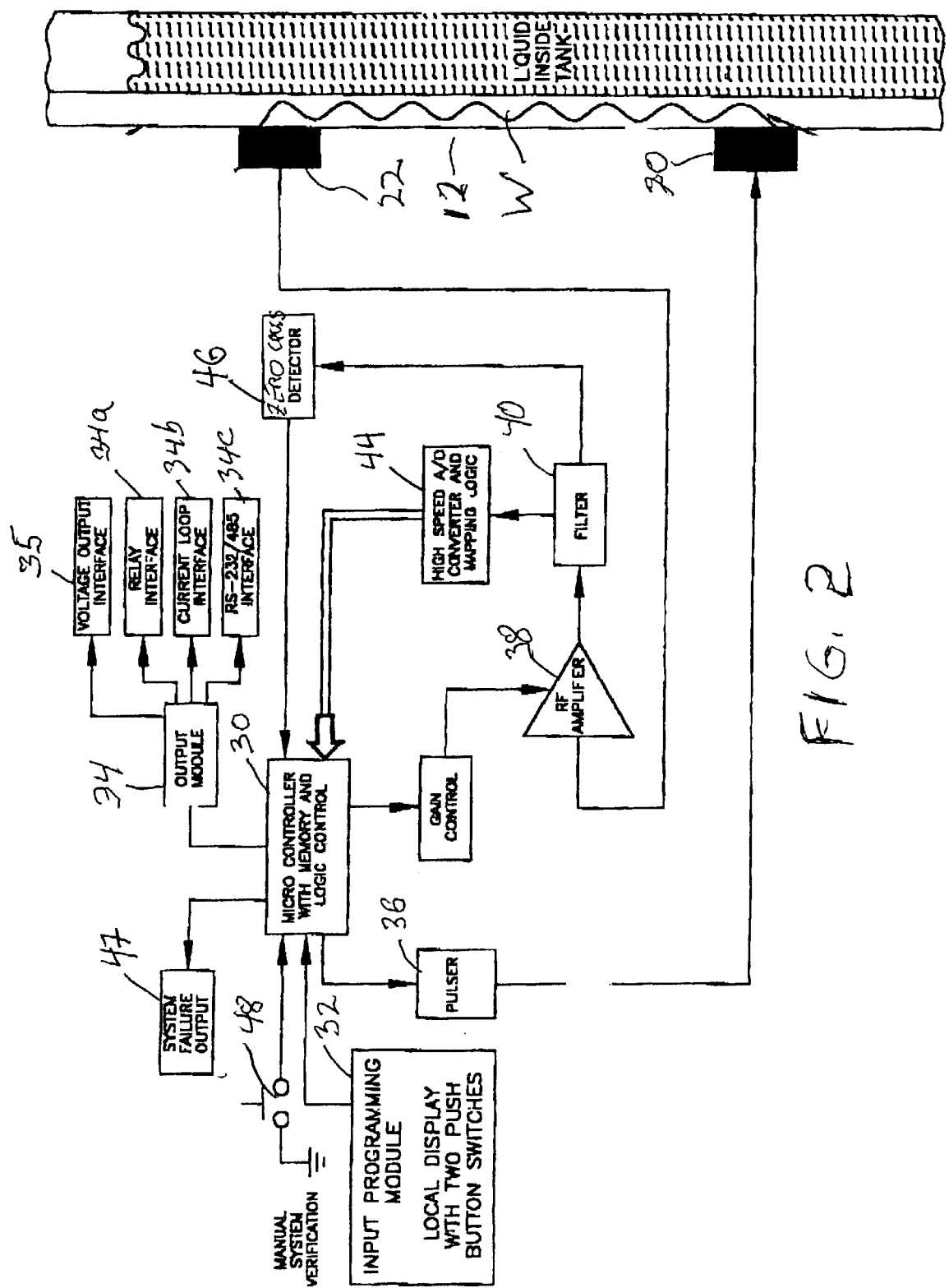
FIG. 2 is a schematic block diagram of the operating circuitry.

FIG. 2 is a block diagram of the processing module 24 of the invention. There is a microprocessor, or microcontroller, 30 that has the usual components including a memory of a capacity suitable for the application, programmable logic circuits and a central processing unit. This is suitably programmed to carry out all of the necessary system functions. The microprocessor 30 is also programmable from an external programming module 32 device that includes suitable input devices (not shown), such as key switches and a numerical or alphanumeric keypad, and a display for indicating the programming steps and the results. The use of the input module is described below. All of this is conventional in the art.

There is an output module 34 for the microprocessor output. It receives the output results computed by the microprocessor. Module 34 includes a voltage output interface 35 that is used to produce a signal to directly display or operate a display device to indicate the presence or absence and/or the level of the liquid in the span range space between the two transducers. This is described below. The output module 34 also includes the usual outputs common in the instrumentation field of a relay interface 34a, a current loop interface 34b and an RS 232/486 computer interface 34c.

The microprocessor 30 is programmed to operate a pulser circuit 36, which produces voltage pulses of a desired duration, for example from 50–200 microseconds. The selection of the pulse duration and amplitude and the pulse repetition rate depends on the characteristics of the vessel wall 12 and to some extent the type of liquid in the vessel. A typical pulse repetition rate is 100 milliseconds. That is, in the example of 100 milliseconds, a voltage pulse is produced by the pulser 36 and applied to the transmitting transducer 20 once every 100 milliseconds. The repetition rate preferably can be set by the input programming module 32 to any desired value, for example, from 10–1,000 milliseconds. Each pulse is supplied to the transmitting transducer 20 mounted to the vessel wall to produce the flexural wave W in the vessel wall. The flexural wave travels in many directions in the vessel wall including one in which it can be received by the receiving transducer 22 which is at a vertical distance d from the transmitting transducer that is fixed and known. The distance d is the span range of effective operation of the system. That is, it is the interior space of the vessel between the two transducers.

After prodcucing a pulse the microprocessor operates the system to receive and process the elastic wave component received by the receiving transducer 22 before the next pulse is produced by pulser 36. The electrical signal produced by the receiving transducer 22 from the components of the flexural wave W in the vessel wall are applied to a radio frequency (RF) amplifier 38 whose output is applied to the input of a filter circuit 40. The bandwidth of amplifier 38 is sufficient to properly amplify the signal. The filter 40 eliminates noise components and is properly configured to pass the signal. It is preferred that the filter is tunable to match the signal frequency band.

Figure 3:
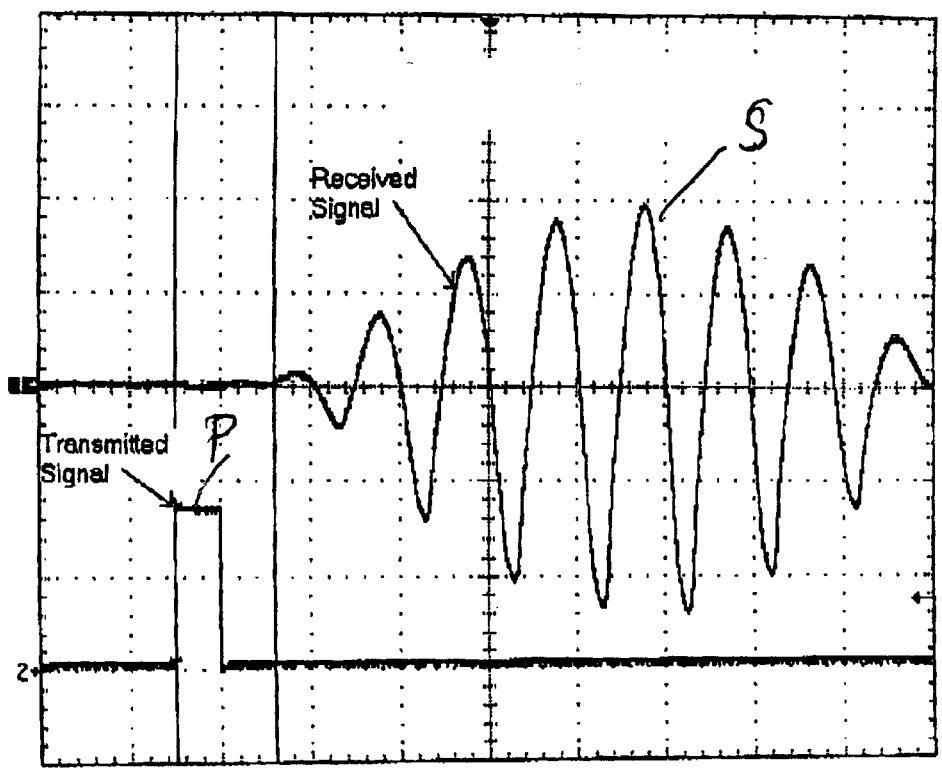
FIG. 3 is a graph showing the travel of a component of the flexural wave produced by a pulse applied from the transmitting transducer.

FIG. 3 is an illustration of a typical scenario of a cycle of transmission and reception. There is a pulse P of energy that is produced and applied by the transmitting transducer 20 to the vessel wall 12. Here, the space in the vessel opposite the transducers can be either wet or dry. The elastic wave is produced in the vessel wall and received by the transducer 22 and the corresponding electrical signal appears at the output of the filter 40 is shown at S. The signal S preferably is the one produced by the first (fastest traveling) component of the flexural wave received by the transducer 22. Although not clearly shown in FIG. 3, the signal S is of varying frequency and first increases and then decrease in amplitude. It should be noted that there is delay between the trailing edge of pulse P and the leading edge of the received signal S. The production of the pulse P is repetitive with a time between pulses that is at least equal to the duration of the signal S.

Figure 4:
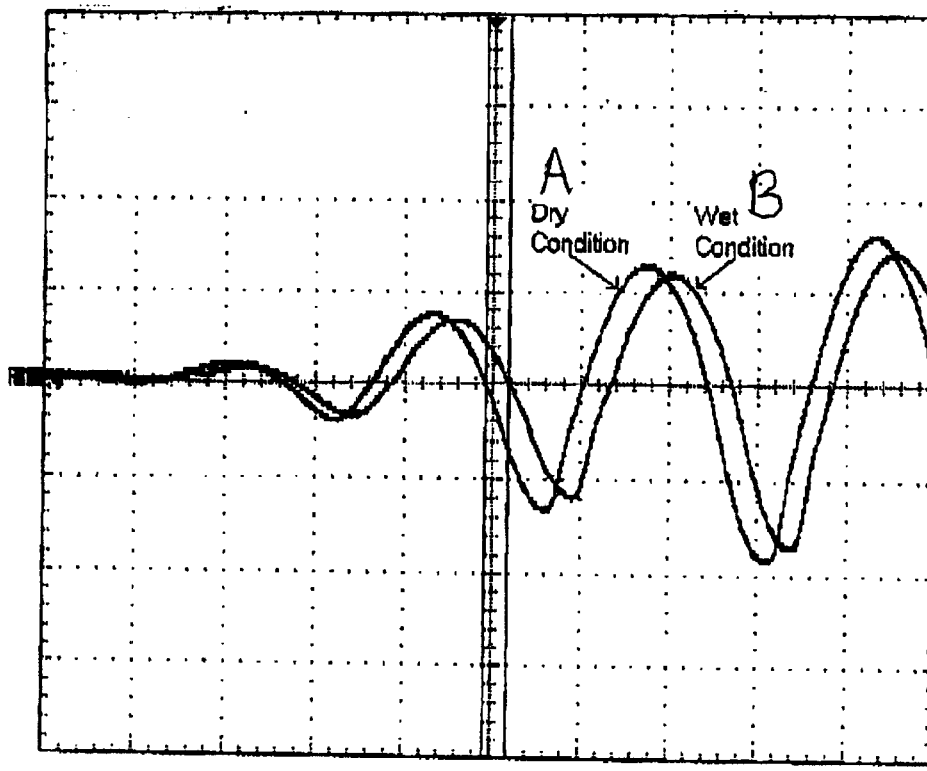
FIG. 4 is a graph showing the difference between the travel time of the flexural wave component is different situations where the inside of the vessel is both dry and contains a liquid.

FIG. 4 shows the relationship between the received signal S with the span range space in the vessel between the two transducers 20 and 22 being in the dry condition, line A, and in the wet condition (liquid present) line B. As seen, the flexural wave component in the vessel wall travels slower when there is liquid in the space. In accordance with the invention, the time difference, or phase delay, between the dry and wet signals provides an indication as to whether the space in the vessel between the two transducers is wet or dry.

The output of filter 40, which is the signal S, is applied to a high-speed analog/digital (A/D) converter 44 that converts the received analog signal into digital form. Any conventional circuit can be used for the A/D converter. One such converter measures the changes in the positive and negative slopes of various parts of the received signal wave S. The digital output of the A/D converter 44, which is a map of the received signal S, is applied to the input of microprocessor 30 for processing as described below.

In a preferred embodiment of the invention, the digital value of each of the signals S produced by several successive single pulses P are averaged to produce a result that is used. That is, the preferred embodiment of the system is programmed to operate to average the waveforms S over several cycles for to produce the result used for each measurement digital value that is to be used in the phase comparison. This minimizes the effect of any synchronous or asynchronous vibrational noise that is present in or around the vessel. The system also continuously measures background (or baseline) noise and if such noise is large enough to cause erroneous readings, the system automatically increases the number of waveforms averaged, until the effect of noise is minimized. When the high-amplitude noise is no longer present, the system reverts to a smaller number of waveforms averaged. In addition, if the noise level is at a moderate level, normal measurements are taken but any automatic adjustments (such as gain control) are minimized to prevent erroneously changing settings due to noise. All of these features improve system accuracy.

The output of the filter 40 also is applied to a detector 46, preferably a zero-crossing type detector, which produces a signal that is applied to the microprocessor to indicate the start of a processing cycle. That is, the start of the received signal S is used to start the processing. It should be understood that the first flexural wave component received by the transducer 22 will be the most accurate and this is detected by the zero-crossing detector 46 used to start the processing.

In a preferred embodiment of the invention the phase delay of a measured waveform relative to a reference waveform or other waveform is calculated by the microprocessor via a modified correlation algorithm. Here, the microprocessor operates such that the data of the measured waveform and reference or other waveform are time-shifted relative to each other, by small steps, and a sum-of-products for the points of interest is calculated for each time shift. This sum-of-products is the correlation value for that time shift. The correlation values are monitored until a peak is found. This peak corresponds to the phase shift (or time delay) between the signals corresponding to the measured and reference or other waveform. The approach of looking for a peak as the correlation values are computed minimizes processing time and the system's response latency. This allows the use of a low-cost, low-power microcontroller instead of a high-cost digital signal processor. Of course, any other suitable technique and hardware components can be used as needed and applicable. This makes data of the measured phase delay available for use, as described below.

Figure 5:
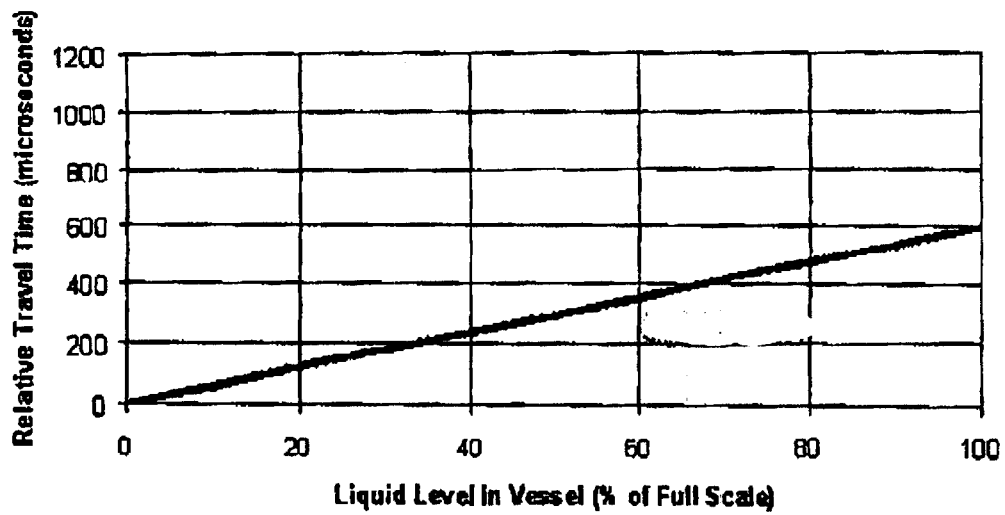
FIG. 5 is a graph showing a value relationship of the travel time of the component of the flexural wave versus the amount of liquid in the space between the two transducers.

It has also been determined in accordance with the use of the single pulse to produce the flexural wave component in the vessel wall that a substantially linear relationship exists in the phase delay for the change of liquid level in the span range space between the two transducers 20 and 22. FIG. 5 is a graph showing the change in travel time of the flexural wave between the two transducers depending upon the percentage of liquid in the span range space between the two transducers. Here the vertical axis is the phase delay and the horizontal axis is the amount of liquid fill in the span range space. As seen, there is a relatively linear value relationship that can be converted to a digital value set or a voltage. FIG. 5 was developed using a vessel with a carbon-steel wall of ⅜" thickness but the principle applies to vessels having walls of different thicknesses and different materials. The phase shift (time delay) value relationship of FIG. 5 can be converted to a voltage or current by the microprocessor output module 34 and voltage output interface 35. Then, the digital value of each signal waveform is converted to a voltage and compared against the relationship and this gives the liquid level in the span range space. For example, the interface could show the height of the liquid in the span range space in terms of inches or as a percentage.

The existence of the phase delay of the flexural wave component produced by the single energy pulse for dry and wet conditions in the vessel and the substantially linear relationship of the delay caused by the level of the liquid in the span range allows the system of the invention to be used in various applications. These include point level detection of liquid rising above or falling below the lowest transducer 20 or some other point, measuring of various set points within the span range space between the two transducers or continuously measuring the level within this span range.

In one type of operation of the system for use as a continuous level indicator of the liquid in the vessel span range between the two transducers 20 and 22, the transducers are first mounted on the outside of the vessel wall separated by a fixed known distance d, which is the span range. The entire interior of the vessel, or at least the interior space in the span range is dry. The input programming module 32 is operated to produce the single energy pulses P and each single pulse P generates an elastic wave signal S. The signal S is applied to the data mapping logic 44 to operate to map the received flexural wave component signal S for the full dry condition in the span range. It is preferred that several signals S be produced for the full dry condition and an average value of the digital values thereof produced and stored in digital form in the microprocessor memory. A received signal in the span range dry condition corresponds to wave A of FIG. 4 and its data is stored in digital form in the microprocessor memory.

Next, the vessel interior is filled, at least by an amount to fill the span range space between the two transducers 20 and 22. The programming module 32 is operated to cause the pulser 36 to operate and the flexural wave component is received by transducer 22, analyzed by the mapping logic 44 and stored in the microprocessor 30 memory. The result will be digital data corresponding to the full wet condition in the span range space. Again, it is preferred that the values of several waveform signals S be averaged. The received signal for the full wet condition is shown by wave B of FIG. 4. The digital value of either of the waveforms A or B can be used as a reference, or baseline, value.

As shown in FIG. 4, a fixed phase, or time, delay exists between the two waves A and B, full dry and full wet, which will be the maximum value delay. This maximum value time delay is represented by digital data, and this is computed by the microprocessor. The maximum value delay can be converted into a voltage of linearly varying amplitude that is produced by the output module 34 and voltage output interface 35, which can include a digital to analog converter. Such converter can be part of the microprocessor.

The maximum value time delay is displayed by the input programming module 32. The module 32 is then used to set a linear relationship over the range of the maximum phase delay, corresponding to FIG. 5. For example, if the two transducers 20 and 22 are set at 10 inches apart and the maximum phase delay between full dry and full wet in the span range space between the two transducers is 100 microseconds, then each 10 microseconds of delay from the baseline value in the full dry condition corresponds to 1" of liquid in the vessel interior span range space between the two transducers 20 and 22.

After the initial setup of establishing the dry condition baseline (reference waveform) and determining the maximum phase delay, the system is operated normally with the pulser 36 producing the individual pulses. The return data from each pulse, or preferably the average value of several successive pulses, is analyzed and converted to digital form. This is compared with the full dry baseline value. If it is the same, then no liquid has entered the vessel interior space between the two transducers. That is, there is no liquid above the transmitting transducer 20. If liquid enters the vessel interior span range space, then the measured phase delay will vary from the full dry condition baseline value. The amount of the delay, between zero (full dry) and the maximum (full wet) determines the level of liquid in the span range. This value can be displayed by the output module 34 and 35 as a continuous range of from 0–100% of the span range. Considering this from another perspective, the deviation of the arrival time of the signal from the baseline is a measure of whether liquid has entered the vessel interior in the space between the two transducers and the height of the liquid level in the space of the span. The system can be operated in a reverse manner by using the full wet condition waveform B as the reference and determining the amount of decrease of liquid height in the span range space.

In the above configuration, instead of providing a continuous liquid level output reading a series of set point values can be programmed to give alarms at varying values within the span range. For example, consider that alarms are to be produced at various points, such as 20%, 40%, 60% and 80% within the span range. The microprocessor 30 is programmed to produce output signals when the measured phase delay indicates that the liquid has reached these points in the span range. The output module 35 operates the voltage output interface 35 in response to these signals to produce a voltage on a display or alarms or other operating signals from any one or more of the interfaces 34a, 34b and 34c.

Another way of using the system is measure the appearance of liquid at a discreet point in the vessel. For example, if the rise in liquid within the vessel is to be detected at a particular point, then the lower transducer 20 of the pair is mounted at this point. Here, the system does not need any initial calibration for the span range or storage of data to set the data for a baseline reference waveform. Instead, the microprocessor is programmed to transmit the pulse P and make a digital map of the returned signal S which is stored. The digital map of the next returned signal S is compared with the stored value of the preceding signal S. For example, if there is no liquid in the vessel at a point above the lower transducer 20 and there is no change in the phase delay between the successive waveform signals, then this indicates that the dry condition prevails in the span range above the lower transducer. A change in the phase delay of one signal as compared to the preceding one indicates that the liquid level in the vessel has risen to a point at or above the lower transducer. If there is no further change in the phase delay, then there has been no change in the liquid level in the span range.

Further changes in the phase delay of the return signal S is an indication that the liquid level is changing. The direction of change is an indication of whether the liquid level is rising or falling and the amount of the phase delay change is an indication of the amount of liquid level change. If the relationship of amount of phase delay change to liquid level change is known and programmed into the microprocessor, such as like FIG. 5, then the actual change in liquid level within the span range can be determined and displayed.

The system can be configured to operate in the opposite direction that is, to sense the fall of the liquid in the vessel to a point below the uppermost transducer.

Figure 6:
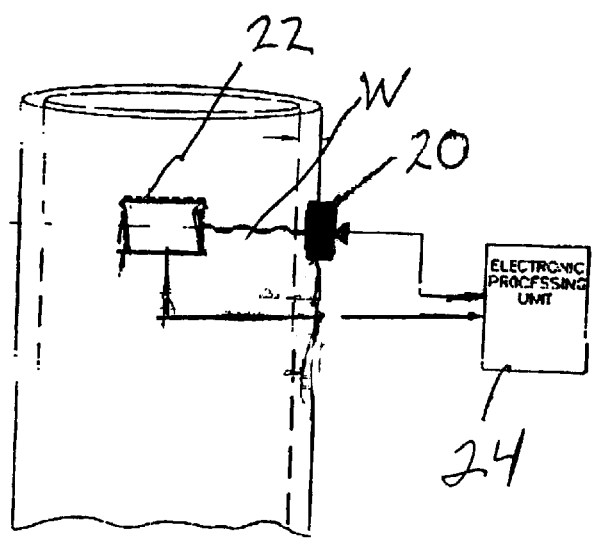
FIG. 6 is a diagram of a configuration that can be used for point level liquid sensing.

FIG. 6 illustrates another type of discreet point level measurement configuration. Here, instead of spacing the transducers 20, 22 apart vertically as in FIG. 1, they are mounted on the exterior of the vessel wall 12 spaced apart at the same height where the liquid level is to be sensed. That is, the transducers are on the same horizontal line. The operation of the system is the same as previously described in that the travel time of the flexural wave form the transmitting transducer 20 to the receiving transducer 22 differs in the conditions when the liquid in the vessel is below the transducers, corresponding to dry, or at or above the transducers, corresponding to wet. Here, successive waveforms S are compared and a change indicates a change in the liquid condition at the level of the transducers.

The system has a self-check capability, either continuously or on demand, to detect failure of any sensor components, electronic component provides an alarm condition via an alarm 47 which can be either or both of audible or visual. This type of check includes checking bonding of the transducer piezo electric element to its inner wall of housing, the bonding with the support structure which is the wall of the tank/vessel/container. If any of the above conditions fail, the transducer will not detect the liquid level inside the vessel. To accomplish this on demand, the processing module 24 of FIG. 2 includes a switch 48 that is actuated to cause the microprocessor to run a self check routine. The microprocessor also can be programmed to automatically run the routine at specified times.

Figure 7:
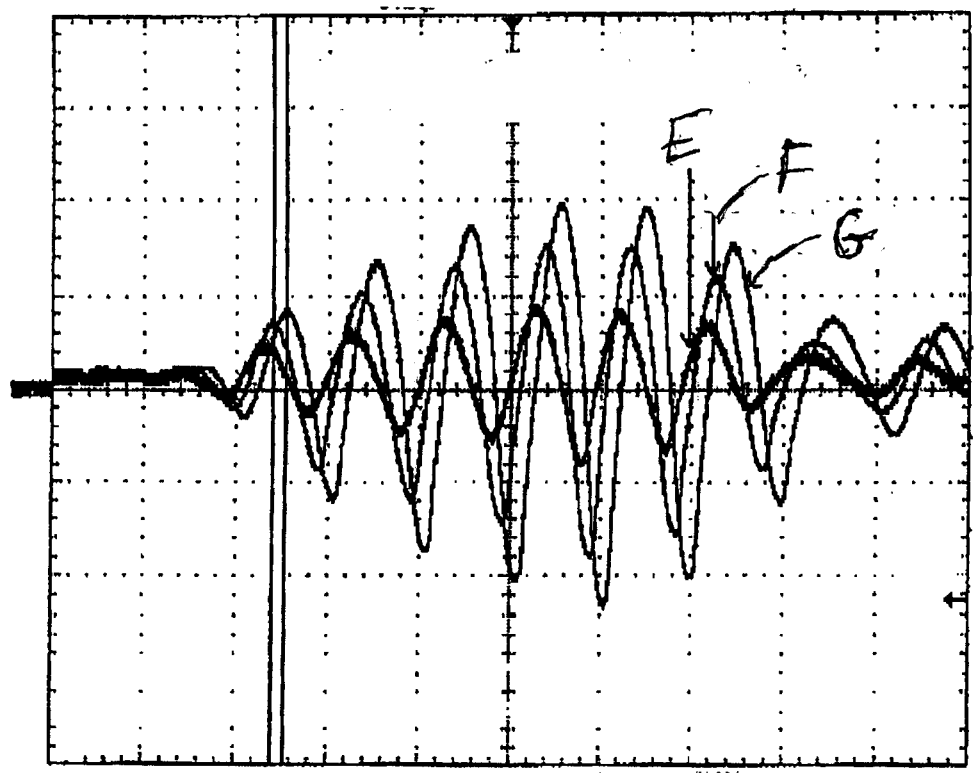
FIG. 7 is a timing diagram showing a self check feature of the system.

FIG. 7 illustrates the self check routine. Here, single energy pulses P, each of a different time duration, are produced and applied to the transmitter transducer 20 and the received signal S produced by each single pulse are analyzed in successive cycles. In FIG. 7 lines E, F and G respectively represent the received signals S when the flexural wave is produced by energy pulses of 100, 250 and 500 microseconds. Any other suitable value can be used. The travel time of the flexural wave between the two transducers is different and has a fairly fixed relationship for the different duration single pulses P. This is true whether the interior vessel condition in the space between the two transducers is full dry, full wet or only partially wet. A determination of the correct difference in travel time between the flexural waves produced by the different duration sonic pulses is an indication that the various system components are operating properly. As explained above, this is done by converting each signal waveform S to a digital value. Also, as before, the digital values of several single pulses P of the same time duration can be averaged to produce the final value used for the comparison.

The self check system of FIG. 7 differs from the verification scheme used by U.S. Pat. No. 5,456,114 which places liquid outside the tank between two transducers, for the disclosed single point liquid level system.

Also, during normal operation, the system is preprogrammed to continuously monitor received signal quality. If the received signal amplitude becomes smaller than a software settable threshold, error condition will be reported, such as by the alarm 47.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A system for measuring the level of liquid in the interior of a vessel comprising:

a pair of ultrasonic transducers mounted spaced apart on the exterior of the wall of the vessel;

means for producing single pulses of electrical energy at successive spaced times having an output coupled to one of said transducers which converts each electrical energy pulse to a corresponding pulse of electro-mechanical energy that is applied to the vessel wall to generate propagation of an elastic wave in the vessel wall that is received after a phase delay by the other transducer which converts the received elastic wave into an electrical signal waveform; and means for processing a said electrical signal waveform from said other transducer to determine the phase delay between the start of propagation of said elastic wave by said one transducer and the reception of the elastic wave by said other transducer.

2. The system as claimed in claim 1 wherein said transducers are spaced vertically apart.

3. The system as claimed in claim 2 wherein said processing means further comprise means for computing the phase delay between received electrical waveform signals produced by said single pulses of electro-mechanical energy at different times.

4. The system as claimed in claim 3 wherein said processing means further comprises means to convert a said electrical waveform signal into a digital value and said computing means computes said phase delay based on said digital value.

5. The system as claimed in claim 3 wherein said computing mean stores as a first reference the digital value of a waveform signal produced by successive pulses and said first reference can vary.

6. The system as claimed in claim 3 wherein said computing means stores as a first reference a digital value that is constant and representative of a static condition of the level of liquid in the space between said two transducers.

7. The system as claimed in claim 6 wherein said first reference corresponds to when the vertical space between said two transducers is in a first condition of one of fully filled or fully empty and the digital value of a later produced waveform signal is compared to said first reference.

8. The system as claimed in claim 7 wherein said computing mean stores as a second reference the digital value of a waveform signal produced when the vertical space between said two transducer is in a second condition of the other of said fully filled or fully empty first condition; and further comprising an interface means for producing a value relationship corresponding to the difference between said first and second references that is a continuous representation of the height of the liquid in the space between said two transducers.

9. The system as claimed in claim 8 further comprising means for comparing the digital value of a signal waveform to said value relationship to determine the height of the liquid in the space between said two transducers.

10. The system as claimed in claim 9 further comprising alarm means responsive to the result of a comparison to indicate that the level of the liquid in the space between said two transducers has reached one or more pre-settable values.

11. The system as claimed in claim 1 wherein said transducers are at the same level on the vessel wall.

12. The system as claimed in claim 1 wherein said processing means further comprises means for computing the phase delay between received electrical waveform signals produced by said single pulses of electro-mechanical energy at different times.

13. The system as claimed in claim 12 wherein said processing means further comprises means to convert a said electrical waveform signal into a digital value and said computing means computes said phase delay based on said digital value.

14. The system as claimed in claim 12 wherein said computing mean stores the digital value of a waveform signal as a reference to which is compared the digital value of a later produced waveform signal.

15. The system as claimed in claim 14 wherein said two transducers are at the same level on the vessel wall and said digital value of said reference waveform signal is produced prior to the production of the digital value of said later produced waveform signal.

16. The system as claimed in claim 1 further comprising means for operating said means for producing pulses of electrical energy to produce successive pulses each of a predetermined different duration; and further comprising computing means responsive to the electrical signal waveforms generated by said different duration pulses to determine the phase delay there between to determine proper operation of the system.

17. The method of detecting the status of liquid within a vessel comprising the steps of:

mounting a pair of transducers in a spaced relationship on the exterior of the wall of the vessel;

producing at different times a single pulse of electro-mechanical energy from one of said transducers that is coupled to the vessel wall to generate a flexural wave that is received after a phase delay by the other transducer which produces in response thereto a signal waveform that is representative of the travel time of the flexural wave from said one transducer to said other transducer; and measuring the phase delay between signal waveforms produced at different times to determine if there is a change in the status of the presence of liquid in the space between said two transducers.

18. The method of detecting as claimed in claim 17 wherein said two transducers are mounted with one of vertical or only horizontal spacing.

19. The method of detecting as claimed in claim 17 wherein said two transducers are mounted in a vertically spaced relationship, and further comprising the steps of:

establishing a relationship of the phase delay between said two signal waveforms that indicates the height of the liquid in the space between said two transducers; and applying a said measured phase delay to said relationship that indicates the height of the liquid in the space between said two transducers.

20. The method of detecting as claimed in claim 17 wherein the step of producing pulses comprises producing single pulses of different and known duration and comparing the phase differences of the signal waveforms generated by said different duration pulses to check the integrity of components used in the detecting method.

* * * * *